United States Patent [19]

Knaggs

[11] Patent Number: 4,971,388
[45] Date of Patent: Nov. 20, 1990

[54] HEADLINER SUPPORT

[76] Inventor: Jerry W. Knaggs, 313 W. Boston St., Broken Arrow, Okla. 74012

[21] Appl. No.: 464,979

[22] Filed: Jan. 16, 1990

[51] Int. Cl.⁵ .............................................. B60R 13/02
[52] U.S. Cl. .................................. 296/214; 248/217.2
[58] Field of Search ..................... 296/214; 248/217.2, 248/57, 58; 52/407

[56] References Cited

U.S. PATENT DOCUMENTS

| | | | |
|---|---|---|---|
| 2,194,902 | 3/1940 | Heuer | 29/152 |
| 2,711,345 | 6/1955 | Daniels | 296/137 |
| 2,879,105 | 3/1959 | Stahl | 296/137 |
| 4,073,535 | 2/1978 | Alfter | 296/137 |
| 4,172,918 | 10/1979 | Doerer | 296/214 |
| 4,437,282 | 3/1984 | O'Brien | 248/217.2 |
| 4,600,621 | 7/1986 | Maurer et al. | 296/214 |

FOREIGN PATENT DOCUMENTS 194163 11/1982 Japan.
214033 9/1987 Japan.

*Primary Examiner*—Robert R. Song
*Attorney, Agent, or Firm*—Head & Johnson

[57] ABSTRACT

An assembly for supporting a headliner along a selected cross-body contour of vehicle including a resiliently flexible strip curtable to a length longer than the horizontal length but not longer than the peripheral length of the selected cross-body contour of a vehicle roof and a pair of devices for mounting the strip at each end of the cross-body contour for supporting the headliner.

16 Claims, 2 Drawing Sheets

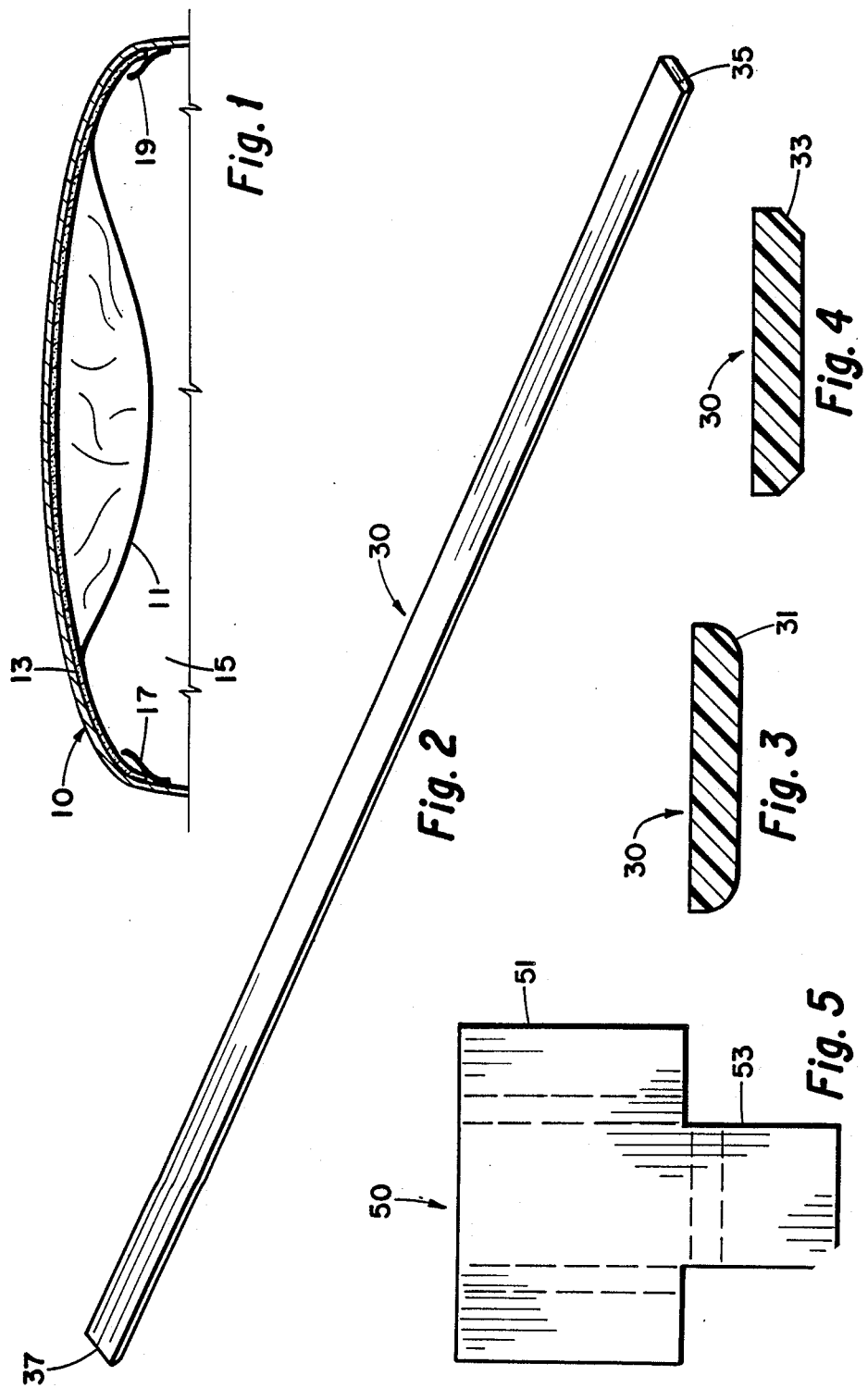

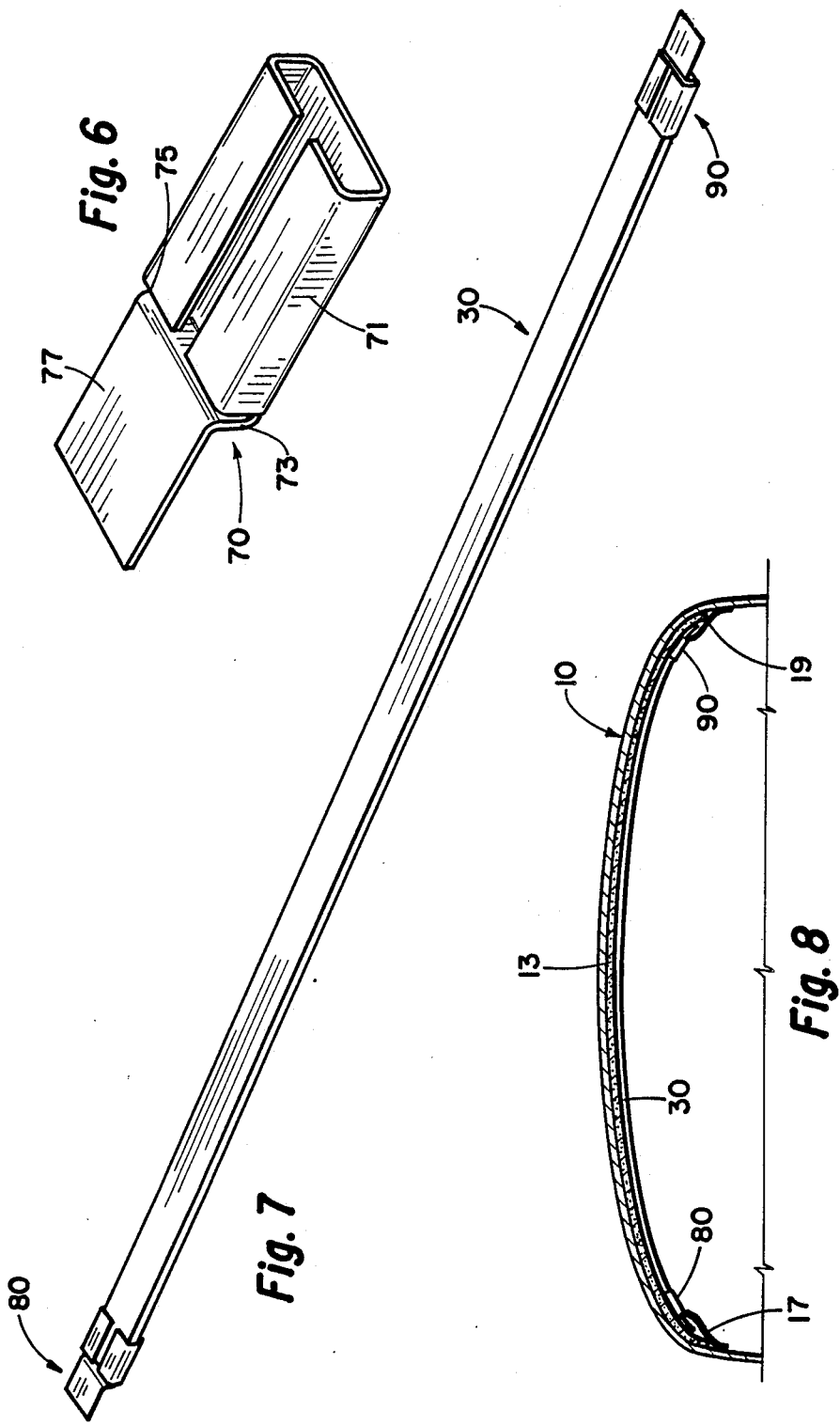

HEADLINER SUPPORT

BACKGROUND OF THE INVENTION:

This invention relates generally to motor vehicle interior repairs and more particularly concerns repair of factory installed foam-backed headliners in automobiles, trucks an vans.

A typical factory installed headliner consists of a nylon or vinyl liner bonded to a foam backing ranging from ⅛ to ½ inch thick. It is not uncommon that, as a function of time, climatic conditions, deterioration of the bonding material, deterioration of the foam backing or for other reasons, the nylon or vinyl liner will separate from the backing and sag into the vehicle compartment. The sagging headliner infringes on the vehicle headroom, detracts from the overall appearance of the vehicle and may be a safety hazard.

In the past, manufacturers have used complex factory installed support structures employing ribbing extending from front to rear and from side to side within the shell defined by the vehicle roof to support the headliner. The use of such elaborate frameworks to support a sagging factory installed headliner is economically and aesthetically impractical. Furthermore, the readhesion of a sagging headliner to its backing is an expensive and often temporary solution. The complete removal and replacement of the headliner is the most widely used alternative because there is no presently available support or repair system that is not extremely complex or does not require drilling, gluing, heating, stitching, mending or the like so that the average consumer can easily, neatly and attractively repair a sagging headliner.

Accordingly, it is an object of this invention to provide a headliner support assembly that is easily installed by a consumer. It is a further object of this invention to provide a somewhat universal headliner assembly that may be readily adapted by a consumer to suit the structure and decor of the consumer's particular vehicle. Another object of the invention is to provide a headliner support assembly which is neat and attractive in its appearance.

SUMMARY OF THE INVENTION:

In accordance with the invention a support assembly is provided which eliminates sag of a headliner trimmed at its side edges by molding. The assembly is adaptable to support the headliner along any selected cross body contour of a vehicle. A resiliently flexible strip, preferably of plastic and preferably of a color suited to the interior decor of the vehicle, may be cut by the consumer to a length longer than the horizontal length of the selected cross body contour but not longer than the peripheral length of that contour. A pair of clips support the flexible strip. Each clip includes a sleeve into which an end of the flexible strip may be slidably inserted. The clip also includes a plate closing one of its ends and a tab which can be inserted between the sagging headliner and the headliner edge molding with the plate abutting the molding. Thus, the consumer need only cut the strip to an appropriate length, mount a clip on each end of the selected cross body contour by inserting the clip tab between the headliner and the molding, insert the ends of the flexible strip into the clip sleeves and pop the flexible strip into a bowed condition toward the roof. The closer the length of the strip matches the peripheral length of the cross body contour, the closer the headliner will be conformed to the roof.

BRIEF DESCRIPTION OF THE DRAWINGS:

Other objects and advantages of the invention will become apparent upon reading the following detailed description and upon reference to the drawings in which:

FIG. 1 is a sectional view of a cross body contour of the roof portion of a vehicle illustrating a sagging headliner;

FIG. 2 is a perspective view of a headliner support strip;

FIG. 3 is a sectional view of one embodiment of the headliner support strip;

FIG. 4 is a sectional view of another embodiment of the headliner support strip;

FIG. 5 is a plan view of a flat member illustrating fold lines according to which a headliner support clip may be formed;

FIG. 6 is a perspective view of a headliner support clip in its finished condition;

FIG. 7 illustrates the headliner support assembly including the strip and the clips in their assembled condition; and FIG. 8 illustrates the headliner support assembly supporting the sagging headliner illustrated in FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION:

FIG. 1 illustrates a sectional view of the roof 10 of a typical automobile, truck or van incorporating a headliner which consists of a nylon or vinyl liner 11 bonded to a foam backing 13. The foam backing 13 is generally on the order of ⅛th to ½ inch thick. As shown, the liner 11 has separated from the foam backing 13 and sags into the motor vehicle passenger compartment 15. The edges of the foam backed liner are trimmed by moldings 17 and 19 covering the edges and secured to the vehicle roof or to a support structure mounted on the vehicle roof (not shown). Once the liner 11 begins to separate from the backing 13, if repair is not effectuated, the weight of the liner 11 will eventually cause the liner 11 to separate from the foam backing 13 all the way to the side molding 17.

FIG. 2 illustrates a resiliently flexible strip 30 intended to span the width of the vehicle at any selected cross body contour of the vehicle and to support the liner 11 at least above the horizontal level and as close to the contour of the roof as may be desired. It will be appreciated that the horizontal distances across cross body contours of cars, trucks and vans will vary depending on the type of vehicle and also that, even as to any one particular vehicle, that distance will vary depending on the point at which the selected cross body contour is taken. The same can be said of the peripheral distance along the roof from one edge molding to the other. Thus, in order to support a sagging headliner from side molding to side molding, without intermediate structure, a support strip which is longer than the horizontal distance between the side moldings but no longer than the peripheral distance between the side moldings must extend from one side molding to the other. Thus, a universally applicable strip longer than the widest possible horizontal distance between edge moldings must be provided which can then be cut by the consumer to the desired length. The strips 30 are typically made of any resiliently flexible material and preferably plastic. They will generally be in a range of ¾ inches to 1¼ inches wide and ⅛ to ¼ inch thick. The strips 30 may be cut with shears or a band saw or any other suitable implement. This is the only step which will require the use of tools by the consumer. The closer the length the strip 30 is to the peripheral distance from edge molding 17 to edge molding 19 along the roof, the closer the sagging liner may be conformed to the contour of the roof. As shown in FIGS. 3 and 4, it may be desirable to curve 31 or bevel 33 the lower edges of the plastic strip 30 into a D-shaped cross-section so as to eliminate sharp surfaces within the motor vehicle passenger compartment.

FIG. 5 illustrates a flat T-shaped member 50 formed from a bendable material, such as a sheet of steel, aluminum or the like. For example, 22 to 26 gauge steel works very well. Fold lines are illustrated on the T-shaped member 50 along which the member may be bent to form a clip for supporting the flexible strip 30 in the vehicle. Typical dimensions of the T-shaped member 50 in its flat condition include a T crossing portion 51 in the range of 2 to 2½ inches wide and 1¼ to 1¾ inches high and a T upright portion 53 in the range of ¾ inches to 1¼ inches wide and 1¼ to 1¾ inches high.

The flat member 50 illustrated in FIG. 5, when bent along the illustrated fold lines results in the metal clip 70 illustrated in FIG. 6. As illustrated, the clip 70 includes a sleeve 71 which has been adapted to slidably receive an end 35 or 37 of the flexible strip 30. The more closely the sleeve 71 is contoured to the cross-sectional configuration of the strip 30, the more snugly the strip 30 will be held by the sleeve 71. The clip 70 also includes a butt plate 73 that closes one end 75 of the sleeve 71 and a tab 77 which extends outwardly from the butt plate 73. As shown in FIG. 7, when one end 35 or 37 of the flexible strip 30 is inserted into the sleeve 71, the end 35 or 37 of the strip 30 will slide into abutment with the butt plate 73 to prevent further horizontal motion of the strip 30 into the clip 70. The tab 77 is designed so that it can be inserted between the sagging liner 11 and the headliner edge molding 17 or 19 until the butt plate 73 comes into abutment with the molding 17 or 19. As shown, the full assembly requires the flexible strip 30 and two mounting clips 80 and 90, one at each end 35 and 37 of the flexible strip.

The installation of the assembly can best be described in reference to FIG. 8 which illustrates the assembly installed to support the sagging liner 11 illustrated in FIG. 1. In the installation process, the consumer will insert the tab 77 of one clip 80 between the sagging liner 11 and one edge molding 17 at the cross-body contour where support is desired. One end 37 of the plastic strip 30 is inserted into the mounted clip 80 and the plastic strip 30 manually bowed toward the roof as much as desired. With the desired amount of bow achieved, the flexible strip 30 is marked at the opposite edge molding 19 to be cut to this appropriate length. The second clip 90 can then be inserted between the opposite edge molding 19 and the liner 11. The ends 37 and 35 of the flexible strip 30 are then inserted into the clip sleeves 71 with the strip 30 bowed upwardly to support the liner 11, thus completing the installation process. If it is desired to contour the plastic strip 30 very snugly with the contour of the roof, it may be necessary that the plastic strip 30 be downwardly bowed during the insertion process and then snapped upwardly into the fixed bow contour.

It can be seen that &:he tabs 77 enable the clips 80 and 90 to be vertically supported by the existing vehicle molding 17 or 19 and the clip sleeves 71 provide vertical support for the flexible strip 30. The clip butt plates 73 cooperate with the existing vehicle molding 17 or 19 to prevent horizontal motion of the clips 80 and 90 with respect to the molding 17 and 19 and also cooperate with the ends 35 and 37 of the flexible strip 30 to prevent the ends 35 and 37 of the strip 30 from moving outwardly horizontally. Thus, no screws, bolts, glue, stitching, clamps or the like are necessary to maintain the support assembly in its installed condition. This is accomplished by the resiliency of the strip 30 which presses the clips 80 and 90 outwardly and thus holds them in position between the molding 17 and 19 and the liner 11

Depending on the amount of damage that exists, it may be necessary to use more than one headliner support assembly. To maintain the attractiveness of the vehicle compartment decor, the plastic strip 30 may be color coordinated to the vehicle. Furthermore, the clips 70 may also be provided with an exterior finish coordinated to the interior of the vehicle.

Thus, it is apparent that there has been provided, in accordance with the invention, a headliner support assembly that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use with a vehicle having a headliner trimmed at its side edges by molding, an assembly adaptable to supporting the headliner along a selected cross-body contour of the vehicle comprising:
    a resiliently flexible strip cuttable to a length longer than the horizontal length but not longer than the peripheral length of the selected cross-body contour; and
    a pair of means for mounting said strip, each having means for vertically supporting said mounting means on said molding at an end of the cross-body contour, means for vertically supporting an end of said strip at said end of the cross-body contour and means for preventing outward horizontal movement of said mounting means and said end of said strip in relation to said end of the cross-body contour.

2. An assembly according to claim 1, said mounting means support means being insertable between the headliner and the molding.

3. An assembly according to claim 1, said strip supporting means comprising means adapted to slidably receive an end of said strip therein.

4. An assembly according to claim 1, said preventing means comprises a plate adapted for abutment on one side with the end of said strip and on the other side with said molding.

5. For use with a vehicle having a headliner trimmed at its side edges by molding, an assembly adaptable to support the headliner along a selected cross-body contour of the vehicle comprising:
   a resiliently flexible strip cuttable to a length longer than the horizontal length but not longer than the peripheral length of the selected cross-body contour; and
   a pair of clips each having a sleeve adapted to slidably receive an end of said strip therein, a plate closing one end of said sleeve and a tab adapted for insertion between the headliner and the molding with the plate abutting the molding.

6. The assembly according to claim 5, said strip being plastic.

7. The assembly according to claim 6, said strip having a D-shaped cross-section.

8. The assembly according to claims 6 or 7, said strip being in the range of ¾" to 1¼" wide and ⅛" to ¼" thick.

9. The assembly according to claims 5 or 6, each of said clips being formed as an integral steel member.

10. The assembly according to claim 9, said member being in the range of 22 to 26 gauge steel.

11. The assembly according to claims 5 or 7, said sleeve being shaped to snugly receive said strip end therein.

12. For use with a vehicle having a headliner trimmed at its side edges by molding, an assembly adaptable to the headliner along a selected cross-body contour of the vehicle comprising:
   a resiliently flexible plastic strip cuttable to a length longer than the horizontal length but not longer than the peripheral length of the selected cross-body contour; and
   a pair of clips each formed from a flat, T-shaped member having a crossing portion bent to define a sleeve for slidably receiving an end of said strip therein and an upright portion bent to define a butt plate closing one end of said sleeve and a tab extending outwardly from said plate, said tab being insertable between the headliner edge molding and the headliner with said butt plate abutting said molding.

13. The assembly according to claim 12, said strip having a D-shaped cross-section.

14. The assembly according to claim 12, said strip being in the range of ¼" to 1¼" wide and ⅛" to ¼" thick.

15. The assembly according to claims 12 or 14, said crossing portion being in the range of 2" to 2½" wide and 1¼" to 1¾" high and said upright portions being in the range of ¾" to 1¼" wide and 1¼" to 1¾" high.

16. The assembly according to claim 15, said T-shaped members being steel in the range of 22 to 26 gauge.

* * * * *